United States Patent [19]
Moore

[11] 3,748,722
[45] July 31, 1973

[54] PRODUCTION OF HOLLOW COMPONENTS FOR ROLLING ELEMENT BEARINGS BY DIFFUSION WELDING

[75] Inventor: Thomas J. Moore, Berea, Ohio

[73] Assignee: The United States of America as represented by the Administrator of the National Aeronautics and Space Administration, Washington, D.C.

[22] Filed: Nov. 9, 1971

[21] Appl. No.: 196,970

[52] U.S. Cl............. 29/487, 29/494, 29/497.5, 29/498
[51] Int. Cl............................................. B23k 31/02
[58] Field of Search.................. 29/498, 493, 494, 29/497.5, 487

[56] References Cited
UNITED STATES PATENTS

| | | |
|---|---|---|
| 1,316,384 | 9/1919 | Murray, Jr. et al............ 29/498 UX |
| 1,939,467 | 12/1933 | Short et al....................... 29/494 X |
| 3,193,920 | 7/1965 | Culbertson et al.................. 29/492 |
| 3,374,529 | 3/1968 | Osborn, Jr. et al............... 29/498 X |
| 3,528,166 | 9/1970 | Portal et al........................... 29/493 |
| 3,550,254 | 12/1970 | Greenspan et al................... 29/493 |
| 3,623,204 | 11/1971 | Wogle.............................. 29/493 X |
| 3,626,582 | 12/1971 | Melill........................... 29/497.5 X |
| 3,632,319 | 1/1972 | Hoppin et al....................... 29/487 |

OTHER PUBLICATIONS

Garrett et al., "Broad Applications of Diffusion Bonding," NASA CR-409, March, 1966, pp. 19-25, 32-36, 80-84 and 138-140. Tech. Library.

Primary Examiner—J. Spencer Overholser
Assistant Examiner—Ronald J. Shore
Attorney—N. T. Musial, John R. Manning et al.

[57] ABSTRACT

A hollow rolling element for a bearing is fabricated by diffusion welding hollow shells together.

3 Claims, 3 Drawing Figures

PATENTED JUL 31 1973 3,748,722

INVENTOR
THOMAS J. MOORE

BY
Norman T. Musial
Gene E. Shook       ATTORNEYS

PRODUCTION OF HOLLOW COMPONENTS FOR ROLLING ELEMENT BEARINGS BY DIFFUSION WELDING

ORIGIN OF THE INVENTION

The invention described herein was made by an employee of the United States Government and may be manufactured and used by or for the Government for governmental purposes without the payment of any royalties thereon or therfor.

BACKGROUND OF THE INVENTION

This invention is concerned with hollow high strength rolling elements for bearings. The invention is particularly directed to an improved method of fabricating hollow balls and rollers from preformed components.

Hollow rolling elements, such as balls and rollers, are used in bearings to reduce weight. Less energy is required for aceleration and deceleration with hollow rolling elements because of their lower inertia.

Electron beam welding has been used to fusion weld preformed halves of hollow rolling elements. Areas of high stresses resulted from this welding process because of excess weld metal or undercut at the root of the weld. When electron beam welded hollow rolling elements are placed in service cracking tends to start near the root of the weld causing failure of the bearing.

SUMMARY OF THE INVENTION

These problems have been solved by fabricating hollow bearing elements by welding in accordance with the present invention. The hollow shell halves are joined by preparing the faying surfaces of the rolling element components and then diffusion welding. No macrodeformation is involved, and no foreign material is introduced at the joint.

OBJECTS OF THE INVENTION

It is, therefore, an object of the present invention to provide an improved welding method for fabricating hollow rolling elements for bearings.

A further object of the invention is to provide an improved hollow rolling element for a bearing.

These and other objects of the invention will be apparent from the specification which follows and from the drawing wherein like numerals are used throughout to identify like parts.

DESCRIPTION OF THE PREFERRED EMBODIMENT

Figure 1:
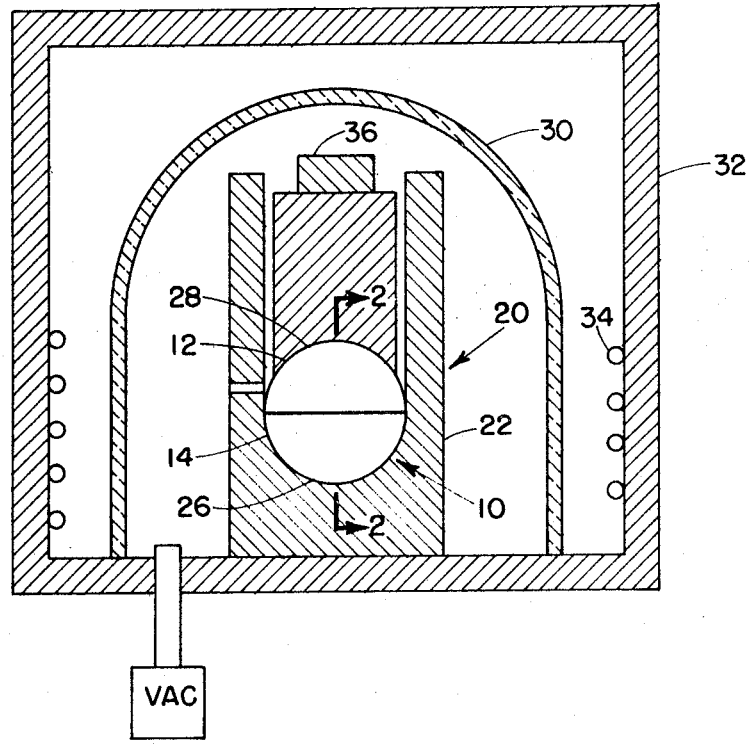
FIG. 1 is a vertical section view of apparatus for joining rolling elements in accordance with the present invention.
Figure 2:
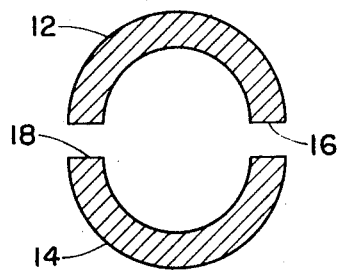
FIG. 2 is an enlarged sectional view taken along the line 2—2 in FIG. 1.

Referring now to the drawing there is shown in FIG. 1 a hollow rolling element 10 that is fabricated in accordance with the present invention. The rolling element 10 may be either a ball or a roller and is made by joining two preformed components 12 and 14 shown in both FIGS. 1 and 2. The components 12 and 14 are in the form of half shells which are either hemispherical in shape for balls or hemicylindrical in shape for rollers.

The preformed component 12 has a mating or faying surface 16 extending about its periphery. The preformed component 14 has a similar surface 18 extending about its periphery. The faying surfaces 16 and 18 are lapped to ensure flatness for optimum mating contact.

Figure 3:
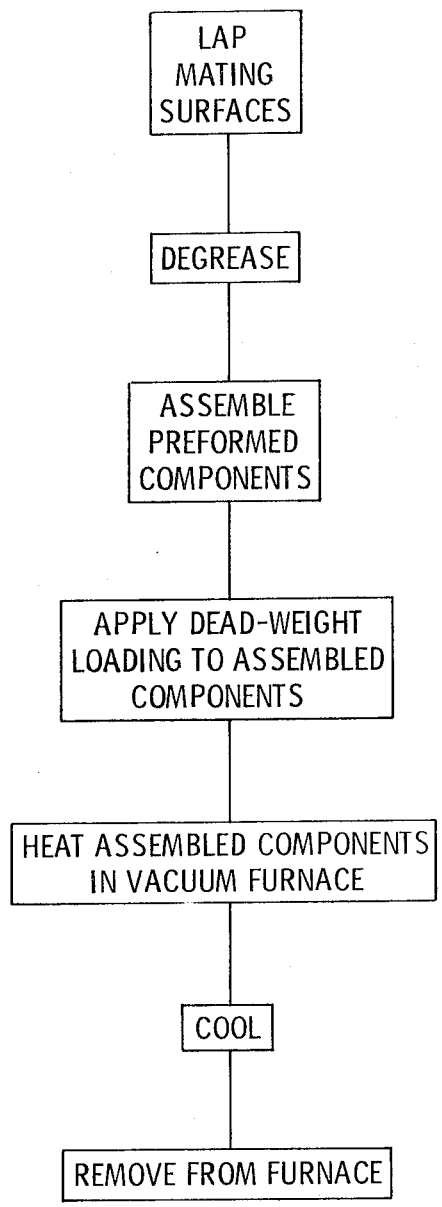
FIG. 3 is a flow sheet illustrating diagrammatically the process for making hollow rolling elements in accordance with the invention.

Referring to FIGS. 1 and 3 the preformed components 12 and 14 are assembled by placing the surface 16 in contact with the surface 18. The preformed components are assembled in the aforementioned manner by placing the two half shells 12 and 14 into a contoured assembly jig 20 shown in FIG. 1. The jig 20 is of a suitable material, such as high-purity alumina that does not react with the rolling element. The jig 20 includes a base member 22 having a suitable opening for receiving a slidable member 24. The base 22 has a contoured surface 26 which mates with the half shell 14. The slidable member 24 has a similarly contoured surface 28 which mates with the half shell 12 as shown in FIG. 1.

The assembled components and the jig 20 are placed in a vacuum chamber 30 as shown in FIG. 1. The vacuum chamber 30 is enclosed in a suitable insulated container 32 having heating coils 34. The vacuum chamber 30 together with the chamber 32 comprise a vacuum furnace. A low welding pressure is applied to the assembled components by a dead weight 36. The vacuum chamber 30 is evacuated to about $2 \times 10^{-5}$ to $4 \times 10^{-5}$ torr. The assembled preformed components are heated in vacuum to a temperature between 1,900°F and 2,150°F.

After the components 12 and 14 have been raised to this high temperature under the vacuum condition the low welding pressure is maintained on the assembled components by the dead weight 36. A very low welding pressure of about 4 psi is all that is required to form a hollow rolling element. This pressure is maintained on the heated components 12 and 14 for between ½ to 4 hours to diffusion weld the components at the faying surfaces 16 and 18.

The aforementioned process was used to diffusion weld balls each having a diameter of eleven-sixteenths inch and a thickness of one-sixteenth inch. After welding the components in accordance with the aforementioned process the 11/16 inch diameter balls were found to be spherical in the as-welded condition. No excess material or undercut was present at the welded joints.

While the preferred embodiment of the invention has been disclosed and described it will be apparent that various modifications may be made without departing from the spirit of the invention or the scope of the subjoined claims. By way of example, it may be desirable to heat treat the welded rolling element after welding. The aforementioned 11/16 inch diameter balls were treated by heating to a temperature of 2,225°F for 6 minutes and oil quenching. The balls were then heated to 1,125°F for two hours and air cooled.

What is claimed is:

1. A method of fabricating a hollow rolling element for a bearing from preformed half shell members having a thickness of about one-sixteenth inch comprising the steps of forming a substantially flat surface about the periphery of each of said members, assembling said members into said hollow rolling element configuration in a jig with said flat surfaces in mating contact, placing said assembled members and said jig in a vacuum furnace, evacuating said furnace to a pressure between about $2\times10^{-5}$ and $4\times10^{-5}$ torr, applying dead weight pressure of about 4 psi to said assembled members, and heating said assembled members in said vacuum furnace to an elevated temperature between 1,900°F and 2,150°F while maintaining said dead weight pressure for about one-half hour to about 4 hours to diffusion weld said members at said flat surfaces.

2. A method as claimed in claim 1 wherein the substantially flat surfaces are formed by lapping.

3. A method as claimed in claim 1 including the step of heat treating the rolling element after diffusion welding.

* * * * *